United States Patent [19]
Sasayama

[11] 3,908,616
[45] Sept. 30, 1975

[54] IGNITION DEVICE FOR USE IN INTERNAL COMBUSTION ENGINE
[75] Inventor: Takao Sasayama, Hitachi, Japan
[73] Assignee: Hitachi, Ltd., Japan
[22] Filed: Dec. 11, 1973
[21] Appl. No.: 423,774

[30] Foreign Application Priority Data
Dec. 18, 1972  Japan............................ 47-126114

[52] U.S. Cl............................ 123/117 R; 123/32 EA
[51] Int. Cl.².......................................... F02P 3/02
[58] Field of Search ........ 123/117 A, 117 R, 32 EA

[56] References Cited
UNITED STATES PATENTS
3,521,611  7/1970  Finch............................ 123/117 R
3,738,339  6/1973  Huntzinger et al............. 123/117 A
3,749,073  7/1973  Asplund.......................... 123/117 R
3,752,139  8/1973  Asplund.......................... 123/117 R
3,783,850  1/1974  Habert............................ 123/117 R
3,831,563  8/1974  Brittain et al.................. 123/32 EA Primary Examiner—Charles J. Myhre
Assistant Examiner—Joseph A. Cangelosi
Attorney, Agent, or Firm—Craig & Antonelli

[57] ABSTRACT

One ignition cycle is divided into first and second regions. In the first region, clock pulses are counted up while clock pulses are counted down in the second region. The ignition angles are detected when the result of count down equals a predetermined value.

16 Claims, 3 Drawing Figures

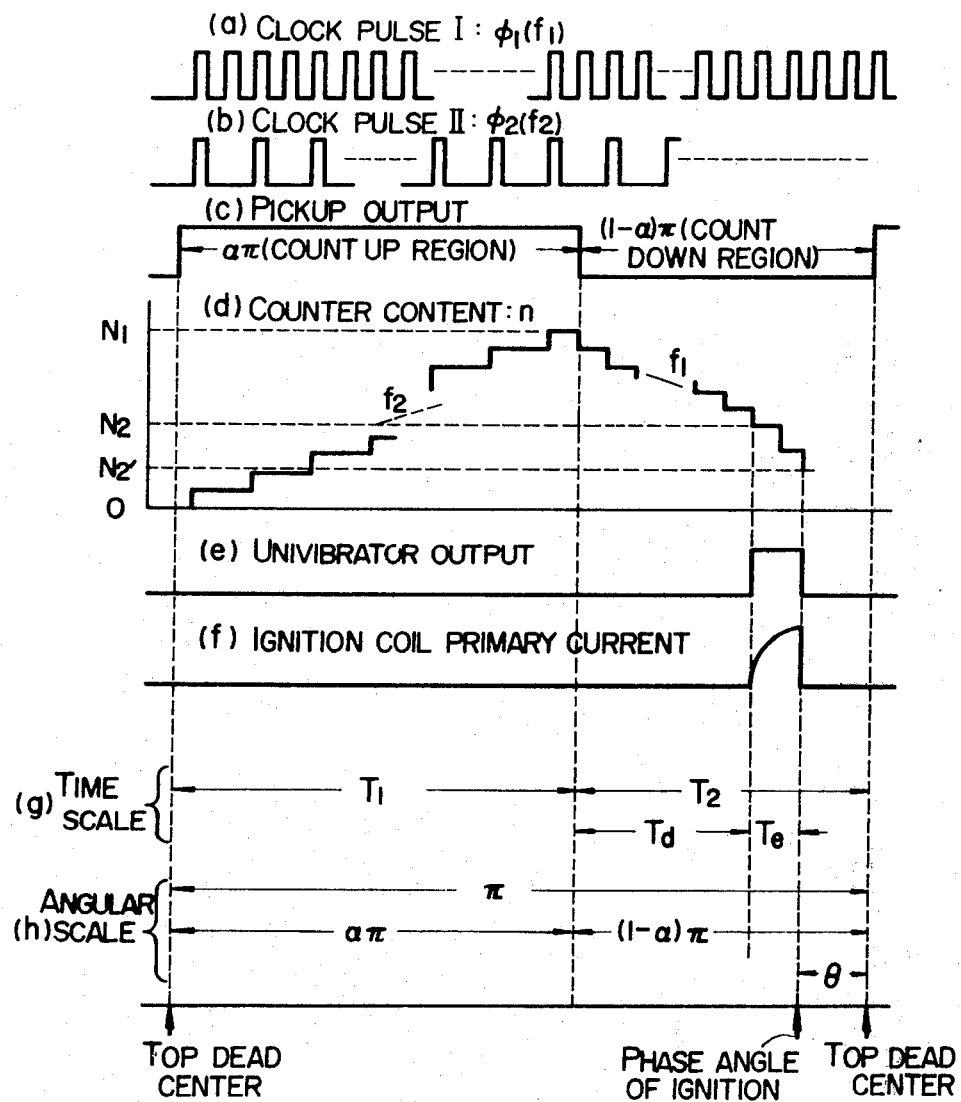

IGNITION DEVICE FOR USE IN INTERNAL COMBUSTION ENGINE

The present invention relates to an ignition device for an internal combustion engine and more particularly to an ignition device in which the ignition timing is controlled by an electronic circuit.

It is necessary, in an ignition device in which the spark voltage is obtained by interrupting the current through the ignition coil, to supply current for the ignition coil before each ignition timing for a time long enough to store a sufficient amount of electromagnetic energy in the ignition coil. With an engine having variable rotational speed, it is useless to merely detect the instant certain constant time before each ignition timing and to start the conduction of current through the ignition coil at that instant. In the conventional ignition timing control system, therefore, current is supplied for the ignition coil corresponding to a certain angular position of the crank shaft or in a certain constant period after the instant of the just previous cut-off of the current. In both cases, however, the time of current conduction varies with the rotational speed and the current to be interrupted cannot be kept constant. Further, if the lower limit of current conduction time is determined with respect to the maximum speed so as to prevent the decrease in the current through the ignition coil at high speeds, then the time of current conduction at the low speed operation is so long that a considerable amount of reactive power is consumed in the ignition coil, transistors for switching current on and off, and their drive circuits. And this may cause the deterioration in insulation, semiconductor parts and, in the limiting case, the fault of the system and also lead to the increase in the size of the overall circuit of the system.

The conventional means for securing automatic ignition timing control by centrifugally operated mechanisms and devices actuated by the pressure difference between the inlet manifold and the outside air, has a poor durability, is not stable during transitory operation such as starting, acceleration or deceleration, and has left the problem of environmental pollution by exhaust gas. The poisonous substances in the exhaust gas especially increase during the warming-up period just after starting and it is preferable to make the period as short as possible. For this purpose, it is effective to increase the generation of heat at the cost of the rotational energy converting efficiency of the engine and moreover the warming-up period can be shortened by appropriately retarding the ignition timing. However, if the timing of ignition is merely retarded with respect to the reference one in the conventional means in which the ignition timing advances with the increase in rotational speed, the ignition timing advances with the increase in the rotational speed accompanied by temperature rise so that the amount of generated heat decreases to suppress the desired effect. In order to increase the amount of heat generated for a short time, the ignition timing must be retarded in proportion to the increase in the rotational speed during the warming-up period. The conventional system can be adapted for this characteristic only by the addition of a complicated mechanism and the problems of cost and durability will arise.

To keep constant the time of current conduction through the ignition coil and to provide a function of retarding the ignition timing are both concerned with the control of ignition timing in response to the variation of the rotational speed, and attempts have been made to perform such a control with an electronic circuit.

In order to electronically control the ignition timing, it is necessary to detect the angular position of the crank shaft at any instant, on the basis of a signal representative of a certain angular position of the shaft. An analog method in which the charge and discharge of a capacitor is used, in usually employed for this purpose. According to this method, however, there can be obtained at most two to four signals such as mentioned above during one cycle of the operation of the engine and when the engine is at a low speed operation, the available current for those integrations is very small so that the control of the current and the comparison of analog voltage levels and the arithmetic operation of them, with high accuracy, are impossible.

Further, the analog circuit which must be carefully adjusted to be used in the field where phase difference is mainly concerned, has a poor producibility.

It is, therefore, one object of the present invention to provide an ignition device having a high accuracy.

Another object of the present invention is to provide an ignition device having excellent durability and reliability.

Yet another object of the present invention is to provide an ignition device having a function useful for the purification of exhaust gas.

The feature of the present invention is that two signals are produced during one ignition cycle and the lead or lag of the phase angle of ignition or the storage of electromagnetic energy in the ignition coil is controlled by calculating the phase angle or angle of current control on the basis of the predetermined difference between the number of clock pulses counted between the first and second signals and the number of clock pulses counted after the second signal.

Other objects, features and advantages of the present invention will be apparent when one reads the following description of the specification with the aid of the attached drawings, in which:

FIG. 3 is a time chart useful for the explanation of the operation of the ignition device shown in FIG. 1.

Figure 1:
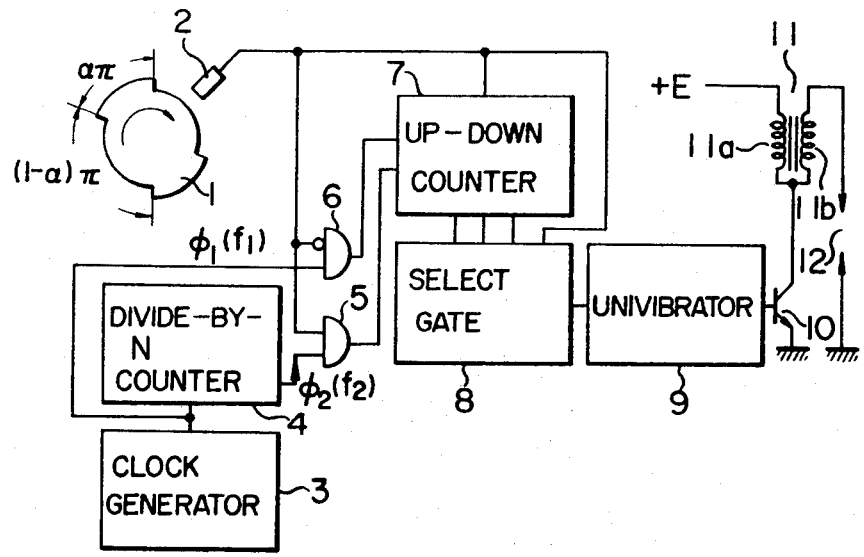
FIG. 1 is a block diagram of an ignition device embodying the present invention.
Figure 2:
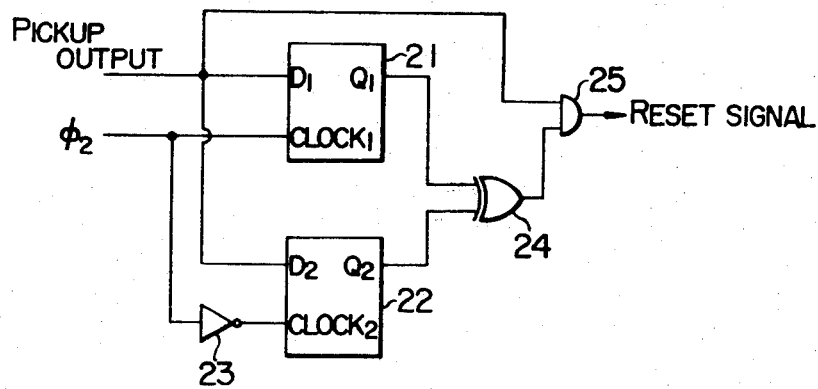
FIG. 2 is a reset circuit of an up-down counter used in the ignition device shown in FIG. 1.

In FIG. 1, a rotor 1 is rigidly fixed to the rotary shaft of an internal combustion engine. In this case, the engine is a four-cylinder, four-cycle one and the rotor 1 has a pair of large-diameter portions diametrically opposite to each other, each cycle corresponding to 180° of the rotor disc. A magnetic pickup 2 serves to magnetically detect the approach of the large-diameter portions, i.e. projection, on the rotor 1 which is, for example, made of magnetic material. A clock generator 3 delivers clock pulse signal $\phi_1$ whose pulse repetition rate $f_1$ is selected from 200 KHz to 10 MHz. A divide-by-N counter 4 consists of, for example, $m$ stages of binary counters and serves to reduce the repetition rate of the clock signal $\phi_1$ by a factor of $\frac{1}{2^m}$, the counter 4 delivering an output signal $\phi_2$ having a repetition rate $f_2$. AND gates 5 and 6 perform selective operations as follows. Namely, when the output of the pickup 2 is of high level (corresponding to the region of $\alpha\pi$), the clock signal $\phi_2$ is delivered while when the output of the pickup 2 is of low level, the clock signal $\phi_1$ is delivered (corresponding to the region of $(1-\alpha)\pi$). An up-down counter 7 can perform counting down as well as counting up or ordinary counting. The up-down counter 7 adds the pulses of the clock signal $\phi_2$ delivered from the AND gate 5 and subtracts from the number of pulses of the clock signal $\phi_1$ the number of the pulses delivered from the AND gate 6. When the output level of the pickup 2 is high, the operation is in the adding mode while when the level is low, the operation is in the subtracting mode. A select gate 8 has the output of the pickup 2 and the content of the counter 7 as its inputs. The select gate 8 delivers an output when the level of the output of the pickup 2 is low and when the content of the counter 7 becomes coincident with a predetermined value. A univibrator 9 (which is, for example, a monostable multivibrator) is triggered by the output of the select gate 8 to deliver an output pulse having a constant duration. A transistor 10 is rendered conductive while the univibrator 9 is delivering the output pulse of constant duration. As soon as the output of the univibrator 9 has ceased, the transistor 10 is cut off. An ignition coil 11 has a primary winding 11a and a secondary winding 11b, the primary 11a being connected between a power source E and the collector of the transistor 10. When the transistor 10 is conducting, current flows through the primary winding 11a and when the transistor 10 is cut off, the electromagnetic energy stored in the primary winding 11a is released to induce a high voltage across the secondary winding 11b. A spark gap 12 (of an ignition plug) breaks down to establish ignition spark when the voltage induced in the secondary 11b is applied thereacross.

Now, the reset circuit of the up-down counter 7 will be described. The reset circuit uses as an instruction for clear operation the time difference between the instant of rising of the output pulse of the pickup 2 and the arrival of the first pulse of the clock signal $\phi_2$. In its typical form, the reset circuit comprises a pair of D-type flip-flops 21 and 22, a NOT circuit 23, an exclusive OR circuit 24 and an AND circuit 25. The D-type flip-flop is a flip-flop which transfers the input signal at the data terminal (D) to the terminal (Q) upon reception of clock pulses. The data terminals $D_1$ and $D_2$ of the flip-flop 21 and 22 receive the signal delivered from the pickup 2, and the clock terminal $CLOCK_1$ of the flip-flop 21 receives the clock signal $\phi_2$ while the clock terminal $CLOCK_2$ of the flip-flop 22 receives the signal $\overline{\phi_2}$. The outputs from the terminals $Q_1$ and $Q_2$ of the flip-flops 21 and 22 are both fed to the exclusive OR circuit 24, the output of which together with the output of the pickup 2 is applied to the AND circuit 25 to produce a reset signal.

Next, the operation of the ignition device shown in FIG. 1 will be described through reference to FIG. 3. In FIG. 3, diagrams (a), (b), (c), (d), (e), (f), (g) and (h) correspond respectively to the clock signal $\phi_1$, the clock signal $\phi_2$, the output of the pickup 2, the content of the counter 7, the output of the univibrator 9, the current through the primary 11a of the ignition coil 11, the time scale, and the angular scale. When the output (c) of the pickup is at the high level, the count (n) of the counter 7 increases in accordance with the clock pulses of the signal $\phi_2$, as shown in the diagram (d). Namely, even if $\phi_2$ or $\overline{\phi_2}$ is repeatedly received when the pickup output signal (c) is low, an output 0 is delivered at both the terminals $Q_1$ and $Q_2$. Accordingly, the output of the exclusive OR circuit 24 is zero so that the output of the AND circuit 25 is 0. When the level of the pickup output is high, an output 1 is received by both the terminals $D_1$ and $D_2$ of the flip-flops 21 and 22. But the outputs at the terminals $Q_1$ and $Q_2$ remain the same till the clock signal $\phi_2$ has arrived. When $\phi_2$ changes from 0 to 1, it is received by the flip-flop 21, serving as a clock signal, to cause the output at the terminal $Q_1$ to be 1. Meanwhile, $\overline{\phi_2}$ changes from 1 to 0 so that the flip-flop 22 remains unchanged to deliver an output 0 at the terminal $Q_2$. Accordingly, the output of the exclusive OR circuit is 1 and that of the AND circuit 25 is 1.

On the other hand, when $\phi_2$ changes from 1 to 0, flip-flop 21 maintains the same condition, while the input at the terminal $CLOCK_1$ of the flip-flop 22 is 1, so that the inputs to the exclusive OR circuit 24 are 1 and 1 to cause the exclusive OR circuit 24 to deliver an output 0. Accordingly, the output of the AND circuit 25 is 0. The output 1 of the AND circuit 25 is the reset signal for the up-down counter 7 and since one clock pulse is missed in counting, the up-down counter should not be cleared to a numeral value zero, but should be reset to a numerical value one.

After the count of the up-down counter 7 has reached $N_1$ which is the content of the counter 7 reached just before the level of the output of the pickup changes from a high level to a low level, the counter 7 performs counting down in accordance with the pulses of the clock signal $\phi_1$. If the count of the counter 7 reaches a value, say $N_2$, previously determined by the select gate 8, the gate 8 is opened to cause the univibration 9 to deliver an output pulse having a duration Te, as shown in the diagram (e). Accordingly, the transistor 10 is actuated to cause current to flow through the primary winding 11a of the ignition coil 11, as shown in the diagram (f). The primary current rises with a time constant determined by the electrical constants of the ignition coil 11. When the actuation of the univibrator 9 is finished, the primary current is interrupted to cause the spark gap of the ignition play to break down to establish electric arc thereacross.

The time scale and the angular scale are to be chosen as shown in the diagrams (g) and (h) in FIG. 3. Namely, $T_1$ is the time during which the pickup output is at high level; $T_2$ the time during which the pickup output is at low level; Td the period between the instant when the level of the pickup output changes from high to low and the instant when the univibrator 9 is triggered; and Te the time during which the univibrator 9 is being actuated. Supposing that the repetition rates or frequencies of the clock signals $\phi_1$ and $\phi_2$ are respectively $f_1$ and $f_2$, then it follows that $$N_1 = f_2 \cdot T_1 \tag{1}$$

and $$N_1 - N_2 = f_1 \cdot Td \tag{2}$$

If the engine in question is assumed to have four cylinders and be operated at four cycles, one ignition cycle corresponds to the rotation of the shaft through $\pi$ radian the ratio of the time during which the pickup output level is high to the time during which the pickup output level is low being expressed by the angular ratio $\alpha/(1-\alpha)$. Accordingly, the phase angle $\theta$ of ignition with reference to the top dead center (corresponding to the angle at which the level of the pickup output changes from low to high) is expressed by the following formula.

$$\theta = \frac{T_2 - (Td + Te)}{T_2} \cdot (1 - \alpha)\pi \qquad (3)$$

Further, it follows from the formulae (1), (2) and (3), on the assumption that the repetition frequency of ignition corresponding to the rotational speed of the engine is $f(= 1/(T_1 + T_2))$, that $$\theta = \left[\left\{1 - \left(1 + \frac{f_2}{f_1}\right) \cdot \alpha\right\} + \left(\frac{N_2}{f_1} - Te\right) \cdot f\right] \cdot \pi$$
$$= (A + B \cdot f)\pi \qquad (4)$$

where $$A = \left(1 - \frac{f_2}{f_1}\right) \cdot \alpha$$

and $$B = \frac{N_2}{f_1} - Te.$$

From the formula (4), it is seen that the phase angle $\theta$ increases in proportion to $f$, i.e. rotational speed, if $B > 0$. This indicates a characteristic that the ignition phase angle tends to lead. If $B < 0$, the ignition phase angle tends to lag while if $B = 0$, the ignition timing is invariable. In the formula (4), the term A is a constant and if the constant is changed, the ignition angle is shifted.

In conclusion, the ignition angle can be shifted by changing the value of $f_2/f_1$ by changing over the value N of the divide-by-N counter in accordance with the rotational speed or the load condition, or the ignition timing characteristics can be changed over by changing the value of $N_2$ by changing over the inputs of the select gate or by changing the term B in the formula (4) by shifting the frequency $f_1$ of the clock signal $\phi_1$.

It is possible to make constant the time during which current is flowing through the primary winding of the ignition coil 11 so long as the characteristic of the phase angle tending to lead is maintained, so that the current can be kept constant when it is interrupted, thus the loss of reactive power at low speed operation vanishing and the spark output being kept constant.

With the circuit arrangement as described above, the ignition angle is calculated digitally and therefore the calculation is stable, so that the calculation can be made very accurate by extremely increasing the frequency of the clock signals per one ignition cycle. Moreover, the digital circuit usually consumes a small amount of power and can lend itself readily to the IC technique, so that high reliability and producibility can be secured. Further, the ignition timing characteristics can be changed over freely by changing one or some of the constants so that the control of the ignition timing for the purpose of purifying exhaust gas can be much facilitated. Furthermore, as described above, since current can be caused to flow through the primary winding of the ignition coil for a constant time, the energy stored in the coil can be made constant, so that a stable spark arc can be established over a wide range of rotational speeds.

The present invention has hitherto been described by way of embodiment and therefore is by no means limited to the embodiment shown in the figures, but many other modifications, alterations and variations will be readily thought of by those skilled in the art. For example, the univibrator may be discarded if the select gate 8 is so modified that when the preset value $N_2$ is reached the gate causes current to flow into the base of the transistor 10 while when the preset value $N_2'$ is reached the gate causes the base current to be interrupted. This is because the relation $Te = (N_2 - N_2')/f_1$ holds if the frequency $f_1$ of the clock signal $\phi_1$ is constant.

Moreover, the present embodiment may be used for an ignition device of capacitor discharge type by designing the circuit so that the electric charges stored in the capacitor may be released to the ignition coil 11 when the actuation of the univibrator 9 is finished, or, in case where the univibrator 9 is not used, by designing the circuit so that the charges in the capacitor may be released to the ignition coil 11 when the content of the counter 7 is $N_2'$.

Further, the same result can be obtained by so designing the circuit as to start the up-down counter not from zero but from a certain value and to trigger the univibrator 9 when the content $N_2$ of the counter is zero.

During the starting period (cranking period), the power consumed by the starter is rather great so that the terminal voltage across the power source falls down. Therefore, it is preferable during that period to increase the time $Te$ during which current flows through the primary winding of the ignition coil.

What is claimed is:

1. An ignition device for an internal combustion engine comprising:
   an ignition coil having a primary winding and a secondary winding;
   switching means provided in series with said primary winding of said ignition coil for introducing electric current to said primary winding from a DC power supply and for interrupting it;
   pulse producing means for producing pulses having a duration corresponding to a predetermined engine crank angle;
   first clock means for producing a first clock signal;
   second clock means for producing a second clock signal;
   first counting means for counting the first clock signal from said first clock means during a time period corresponding to the duration of the pulses from said pulse producing means;
   second counting means for counting the second clock signal from said second clock means responsive to the fact that the production of pulses by said pulse producing means is stopped ;
   means for detecting the fact that the difference between the count value of said first counting means and the count value of said second counting means reaches a predetermined value; and
   control means for on-off controlling said switching means responsive to the output of said detecting means thereby generating a high voltage at the secondary winding of said ignition coil.

2. An ignition device according to claim 1, further comprising means for adjusting the ratio between the repetition rates of said first and second clock signals.

3. An ignition device according to claim 2, in which said control means includes a univibrator.

4. An ignition device for an internal combustion engine, comprising:
- an ignition coil having a primary winding and a secondary winding;
- a switching means connected in series with said primary winding of said ignition coil for introducing electric current from a D.C. power supply and for interrupting it;
- pulse producing means for producing pulses having a duration corresponding to a predetermined engine crank angle;
- first clock means for producing a first clock signal;
- second clock means for producing a second clock signal;
- counting means for counting up the first clock signal from said first clock means responsive to pulses from said pulse producing means and for counting down the second clock signal from said second clock means responsive to pulses from said pulse producing means;
- detecting means delivering an output in response to the fact that the count-down value of said counting means reaches a predetermined value; and
- control means for controlling said switching means responsive to the output of said detecting means.

5. An ignition device according to claim 4, further comprising first gate means adapted to deliver the first clock signal when receiving a pulse from said pulse producing means and second gate means adapted to deliver the second clock signal when receiving no pulse from said pulse producing means, wherein said counting means counts up the first clock signal fed thereto through said first gate means during the presence of the output of said pulse producing means and counts down the second clock signal fed thereto through said second gate means when the output of said pulse producing means has ceased.

6. An ignition device according to claim 5, in which said control means includes a univibrator for producing second pulses having a predetermined duration.

7. An ignition device according to claim 6, further comprising means for adjusting the ratio between the repetition rates of said first and second clock signals.

8. An ignition device according to claim 7, in which said detecting means includes gates each adapted to be fed with its associated one of the bits, of said counting means.

9. In an ignition device for an internal combustion engine including an ignition circuit to which a control signal for controlling the application of ignition energy is applied, the improvement comprising:
- first means for generating first pulses, each of which has a duration corresponding to a prescribed crank angle of the engine;
- second means for generating first and second clock signals, at first and second respective clock frequencies;
- third means, coupled to said first and second means, for counting the number of said first clock pulse signals produced by said second means for the duration of a first pulse generated by said first means, and for counting the number of said second clock pulse signals produced by said second means beginning with the termination of said first pulse; and
- fourth means, coupled to said third means, for comparing the number of first clock pulse signals counted by said third means for the duration of said first pulse with the number of second clock pulse signals counted by said third means beginning with the termination of said first pulse and for providing a control signal to said ignition circuit in response to the difference in the numbers of first and second clock pulse signals counted by said third means reaching a prescribed number.

10. The improvement according to claim 9, wherein said second means includes means for varying the relative frequencies of said first and second clock pulse signals.

11. The improvement according to claim 9, wherein said fourth means includes means for generating a control signal having a specified duration beginning with the instant of detection of the difference in the number of said first and second clock pulse signals counted by said third means reaching said prescribed number.

12. The improvement according to claim 9, wherein said third means comprises an up-down counter and a first gate circuit having a first input coupled to said first means and a second input coupled to receive said first clock pulse signals from said second means and an output connected to said counter, so as to gate said first clock pulse signals to be counted up by said up-down counter for the duration of said first pulse from said first means.

13. The improvement according to claim 12, wherein said third means further comprises a second gate circuit having a first inverted input coupled to said first means and a second input coupled to receive the output of said first means and a second input coupled to receive said second clock pulse signals from said second means and an output connected to said counter, so as to gate said second clock pulse signals to be counted down by said up-down counter beginning with the termination of said first pulse from said first means.

14. The improvement according to claim 13, wherein said second means includes means for varying the relative frequencies of said first and second clock pulse signals.

15. The improvement according to claim 14, wherein said fourth means includes means for generating a control signal having a specified duration beginning with the instant of detection of the difference in the numbers of said first and second clock pulse signals counted by said third means reaching said prescribed number.

16. The improvement according to claim 11, wherein said second means includes means for varying the relative frequencies of said first and second clock pulse signals.

* * * * *